Jan. 11, 1966  W. K. NELSON  3,228,085
MOLDED INTERIORS FOR CASKET TOPS
Filed May 27, 1963
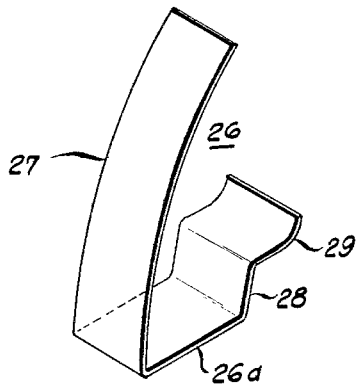
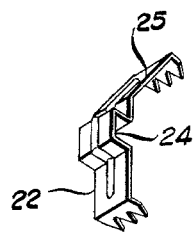
Fig. V
Fig. IV
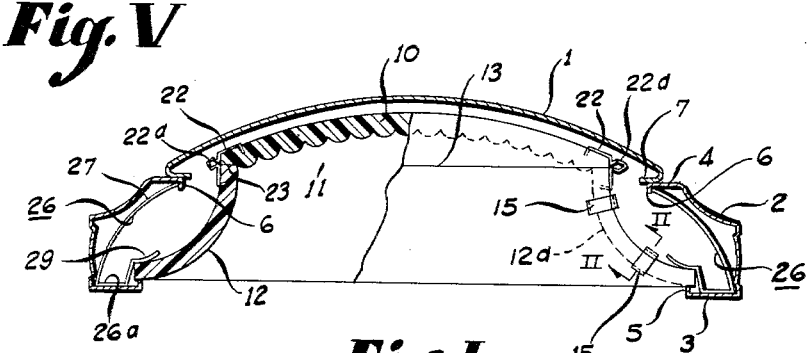
Fig. I
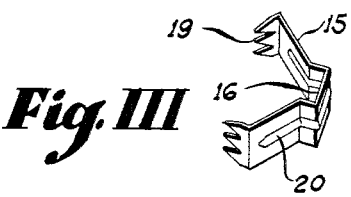
Fig. III
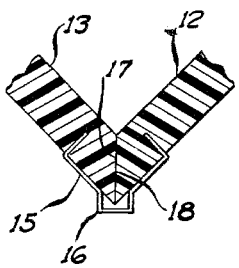
Fig. II
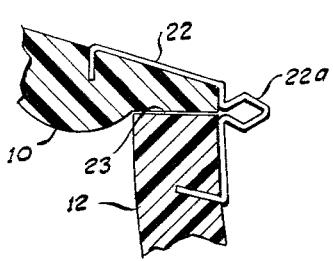
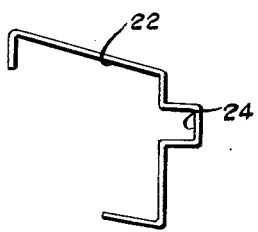
Fig. VI  Fig. VII
INVENTOR.
Walter K. Nelson
BY William B. Jaspert
Attorney.

United States Patent Office 3,228,085
Patented Jan. 11, 1966

3,228,085
MOLDED INTERIORS FOR CASKET TOPS
Walter K. Nelson, Pittsburgh, Pa., assignor to National Casket Company, Boston, Mass., a corporation of New York
Filed May 27, 1963, Ser. No. 283,460
2 Claims. (Cl. 27—19)

This invention relates to new and useful improvements in burial caskets, more particularly to means for fastening molded plastic shapes such as expandable polystyrene to each other and to the sheet metal pre-fabricated casket top after a lining material such as silk or synthetic fibrous sheet material has been fastened to the molded plastic liner by means of gluing or stapling.

It is among the objects of the invention to adapt molded expandable polystyrene or other plastic liners to each other and to the casket top by means of metal retainer clips which are adapted to interlock the molded liners with offset portions of the metal casket top and to join preformed sections of the liner prior to assembly in the casket top.

The invention will become more apparent from a consideration of the accomanying drawing constituting a part hereof in which like reference characters designate like parts and in which:

FIGURE 1 is a vertical cross-sectional view, partially in elevation, of a casket top and molded plastic liner with fastening clips for joining the liner parts and for interlocking the liner with the casket top;

FIGURE 2 is a partial section taken along the line 2—2, FIGURE 1, of a corner clip for joining what is termed in the trade as the ogee roll sections;

FIGURE 3 is a perspective view of the clip shown in FIGURE 2;

FIGURE 4 is a clip employed to join the ogee roll with the center of the liner;

FIGURE 5 is a retainer clip for interlocking the assembled molded liner with the casket top;

FIGURE 6 is an enlarged view of the edge of a molded center piece and ogee roll illustrating how they are joined by a fastening clip; and, FIGURE 7 is a diagrammatic illustration of the clip of FIGURE 6.

As shown in FIGURE 1, the numeral 1 designates the center portion of a casket top of sheet metal having a frame portion 2 with bottom and top flanges 3 and 4, respectively, which have upstanding and depending flanges 5 and 6, respectively. The center portion 1 has an inturned flange 7 which rests upon the flange 4 of the frame member 2.

The metal casket top is provided with a liner molded of expandable polystyrene or other lightweight moldable plastic material, the center piece 10 member having a configuration 11 to create an ornamental effect. The center, which in length corresponds to the length of the casket top, is joined to the ogee roll 12, which is built up of curved sections extending outwardly from the center piece 10, lengthwise and crosswise of the casket top. The numerals 12 and 12a designate the longitudinal sections and the numeral 13 designates a cross member of the ogee roll. As shown in FIGURE 2, the ogee elements 12 and 13 are joined by corner clips generally designated by the numeral 15 and shown in perspective in FIGURE 3. These clips are shaped to form a rectangular recess 16 to permit clinching of the mitered ends 17 and 18 of the ogee rolls 12 and 13.

As shown in FIGURE 3, the corner clips are provided with teeth 19 that readily press into the molded material, of which the ogee rolls are made, and the faces of the corner clips are embossed or raised, as shown at 20, to give structural form for strength.

The ogee rolls, when secured by the corner clips, as shown in FIGURE 2, are secured to the center piece 10 by what may be designated center clips 22, the ends of the ogee rolls 12 and 13 fitting into a shoulder 23 of the center piece 10 as shown in FIGURE 6. Any number of the center clips 22 may be employed to assure permanency in the fastening of the ogee roll pieces to the center piece 10. Like the corner clips, the center clip is shown in perspective in FIGURE 4 and is provided with an offset 24 forming a recess for clinching where the ogee roll joins the center piece, as shown in FIGURE 1. The center clip 22 is generally constructed like the corner clip 15 with teeth and embossing and the portion or leg 25 of the center clip that extends over the top of the center piece 10 is somewhat longer than the opposite leg, as will appear from FIGURE 1 and FIGURE 7 of the drawing. FIGURES 6 and 7 show the center clip 22 before and after assembly.

After the center piece 10 and ogee rolls 12 and 13 are assembled and secured in the manner shown in FIGURE 1, the liner assembly which is now one-half longer and wider than the metal casket top opening, is secured to the casket top by means of retainer clips 26, FIGURE 5, which consist of a long curved leg 27, the base 26a, an inclined short leg 28 and a curved portion or lip 29. When assembled, the seat portion 26a rests upon the flange 3 of the casket top frame, the curved portion 29 engages the concave face of the ogee rolls 12 and 13, and the end of the long leg 27 engages the depending flange element 6 of the casket top to interlock therewith.

By use of the retainer clip, the molded liner is centered and fastened to the casket top in the manner shown in FIGURE 1 without any of the fastening means visible from inside the liner assembly which could now be flocked or comparable decorative application performed if fabrics were not to be used as previously referred to.

Although one embodiment of the invention has been herein illustrated and described, it will be evident to those skilled in the art that various modifications may be made in the details of construction without departing from the principles herein set forth.

I claim:
1. In a metal fabricated burial casket top, a frame portion having top and bottom flanges with upstanding and depending ends, a central panel portion resting upon and secured to said frame portion and a self-sustaining molded lining comprising side and end ogee rolls and a central panel portion, spring clips for securing said lining to the metal frame portion shaped to fit said frame portion, said clips having a relatively long leg with an end abutting the depending end of the top flange to hold the clip in interlocking engagement with the frame portion and having a clamping face in the shape of a curved lip overlying and engaging said lining with the upstanding end of the bottom flange of the frame portion to clamp the lining to said frame portion, the upstanding end of the bottom flange being spaced from the clamping face of the clip less than the thickness of the ogee rolls whereby the clip engages one surface of the roll and the curved lip engages the other surface of the roll.

2. A burial casket top as set forth in claim 1 in which the side and end ogee rolls and center member are separately molded members joined by clips in an interlining assembly with portions of said clips overlying and engaging adjacent faces of said molded members and having their ends imbedded in the bodies of said members.

References Cited by the Examiner
UNITED STATES PATENTS

| | | | |
|---|---|---|---|
| 1,268,091 | 6/1918 | Burkhardt | 27—17 |
| 2,664,615 | 1/1954 | Hillenbrand et al. | 27—19 |
| 2,718,687 | 9/1955 | Woltering et al. | 27—19 |
| 2,964,824 | 12/1960 | Hillenbrand | 27—19 |

RICHARD A. GAUDET, *Primary Examiner.*

WILLIAM E. KAMM, *Assistant Examiner.*